US012500024B2

(12) United States Patent
Yamamoto et al.

(10) Patent No.: US 12,500,024 B2
(45) Date of Patent: Dec. 16, 2025

(54) COIL COMPONENT

(71) Applicant: Murata Manufacturing Co., Ltd., Kyoto-fu (JP)

(72) Inventors: Shigeto Yamamoto, Nagaokakyo (JP); Kaori Takezawa, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 1004 days.

(21) Appl. No.: 17/496,039

(22) Filed: Oct. 7, 2021

(65) Prior Publication Data

US 2022/0130583 A1 Apr. 28, 2022

(30) Foreign Application Priority Data

Oct. 23, 2020 (JP) ................................ 2020-178411

(51) Int. Cl.

*H01F 27/00* (2006.01)
*H01F 17/06* (2006.01)
*H01F 27/28* (2006.01)
*H01F 27/29* (2006.01)

(52) U.S. Cl.

CPC ......... *H01F 27/006* (2013.01); *H01F 17/062* (2013.01); *H01F 27/2823* (2013.01); *H01F 27/29* (2013.01)

(58) Field of Classification Search

CPC .. H01F 27/006; H01F 17/062; H01F 27/2823; H01F 27/29; H01F 41/069; H01F 3/10; H01F 17/045; H01F 27/306; H01F 27/292

USPC .................................. 336/199, 221, 83, 198

See application file for complete search history.

(56) References Cited

U.S. PATENT DOCUMENTS

| | | | | |
|---|---|---|---|---|
| 5,305,961 A * | 4/1994 | Errard | H01F 41/086 29/605 |
| 2004/0263285 A1* | 12/2004 | Suzuki | H01F 41/082 333/185 |
| 2014/0097928 A1* | 4/2014 | Tomonari | H01F 17/045 336/207 |
| 2015/0371766 A1* | 12/2015 | Kawasaki | H01F 17/045 336/212 |
| 2016/0379751 A1* | 12/2016 | Ashizawa | H01F 27/2823 336/182 |

(Continued)

FOREIGN PATENT DOCUMENTS

JP 6578630 B2 9/2019

*Primary Examiner* — Shawki S Ismail
*Assistant Examiner* — Kazi S Hossain
(74) *Attorney, Agent, or Firm* — Studebaker Brackett PLLC

(57) ABSTRACT

A coil component includes a winding core section. A first flange section and a second flange section are disposed on a first end and a second end of the winding core section in the axial direction, respectively. A second terminal electrode is disposed on the first flange section on a second end side in a first direction perpendicular to the axial direction. A fourth terminal electrode is disposed on the second flange section on a second end side in the first direction. When in a portion of the second wire wound around the winding core section, a single round nearest an end connected to the fourth terminal electrode is defined as the Nth turn, at least two turns of the wire closer to the second flange section than the Nth turn of the second wire in the axial direction are present.

20 Claims, 4 Drawing Sheets

(56) References Cited

U.S. PATENT DOCUMENTS

| | | | | |
|---|---|---|---|---|
| 2017/0345560 | A1* | 11/2017 | Tomonari | H05K 1/111 |
| 2018/0211763 | A1* | 7/2018 | Komaya | H01F 27/2828 |
| 2019/0237243 | A1* | 8/2019 | Chuang | H01F 27/2823 |
| 2020/0243251 | A1* | 7/2020 | Yoshino | H01F 41/069 |

* cited by examiner

COIL COMPONENT

CROSS-REFERENCE TO RELATED APPLICATION

This application claims benefit of priority to Japanese Patent Application No. 2020-178411, filed Oct. 23, 2020, the entire content of which is incorporated herein by reference.

BACKGROUND

Technical Field

The present disclosure relates to a coil component.

Background Art

A coil component described in Japanese Patent No. 6578630 includes a winding core section having the shape of a quadrangular prism. A first flange section and a second flange section are disposed on a first end and a second end of the winding core section, respectively, in an axial direction.

A first terminal electrode and a second terminal electrode are disposed on a first end and a second end of the first flange section, respectively, in a first direction perpendicular to the axial direction. A third terminal electrode and a fourth terminal electrode are disposed on a first end and a second end of the second flange section, respectively, in the first direction.

A first wire and a second wire are wound around the winding core section. A first end of the first wire is connected to the first terminal electrode. A second end of the first wire is connected to the third terminal electrode. A first end of the second wire is connected to the second terminal electrode. A second end of the second wire is connected to the fourth terminal electrode. The second wire extends from an edge near the third terminal electrode among the four edges of the winding core section toward the fourth terminal electrode in the vicinity of the second flange section.

SUMMARY

In the coil component described in the above-mentioned patent document, the second wire is connected to the fourth terminal electrode through the vicinity of the third terminal electrode. Therefore, at the time of mounting the coil component on a substrate or other element, solder applied to the third terminal electrode may come into contact with the second wire.

According to preferred embodiments of the present disclosure, a coil component includes a winding core section having a cuboid shape, a first flange section disposed on a first end of the winding core section in an axial direction, a second flange section disposed on a second end of the winding core section in the axial direction, a first terminal electrode disposed on an end portion of the first flange section on a first end side in a first direction perpendicular to the axial direction, a second terminal electrode disposed on an end portion of the first flange section on a second end side in the first direction, a third terminal electrode disposed on an end portion of the second flange section on the first end side in the first direction, and a fourth terminal electrode disposed on an end portion of the second flange section on the second end side in the first direction. The coil component further includes a first wire wound around the winding core section and having a first end connected to the first terminal electrode and a second end connected to the third terminal electrode, and a second wire wound around the winding core section and having a first end connected to the second terminal electrode and a second end connected to the fourth terminal electrode. When a direction perpendicular to both the axial direction and the first direction is defined as a second direction, the first flange section outwardly extends from the winding core section in the second direction, the second flange section outwardly extends from the winding core section in the second direction, and a portion of the second wire that includes the end connected to the fourth terminal electrode extends from a region closer to the third terminal electrode with respect to a center of the winding core section to the fourth terminal electrode in the first direction. When in a portion of the first wire wound around the winding core section, a single round nearest the end connected to the first terminal electrode in a line of the first wire is defined as a first turn and a last turn nearest the end connected to the third terminal electrode in the line of the first wire is defined as an Mth turn and in a portion of the second wire wound around the winding core section, a single round nearest the end connected to the second terminal electrode in a line of the second wire is defined as a first turn and a last turn nearest the end connected to the fourth terminal electrode in the line of the second wire is defined as an Nth turn, at least two turns of the wire closer to the second flange section than the Nth turn of the second wire in the axial direction are present.

In the above-described configuration, the two turns of the wire closer to the second flange section than the Nth turn, which is the last turn, of the second wire are wound around the winding core section in the coil component. In other words, the distance allowing the wire to be wound at least two rounds is provided between the Nth turn of the second wire and the second flange section. Consequently, according to the above-described configuration, solder applied to the third terminal electrode can be prevented from coming into contact with the second wire at the time of mounting the coil component on a substrate or other element.

According to an aspect of the present disclosure, short circuits of the coil component can be prevented.

Other features, elements, characteristics and advantages of the present disclosure will become more apparent from the following detailed description of preferred embodiments of the present disclosure with reference to the attached drawings.

DETAILED DESCRIPTION

A coil component is described below with reference to the drawings.

Figure 1:
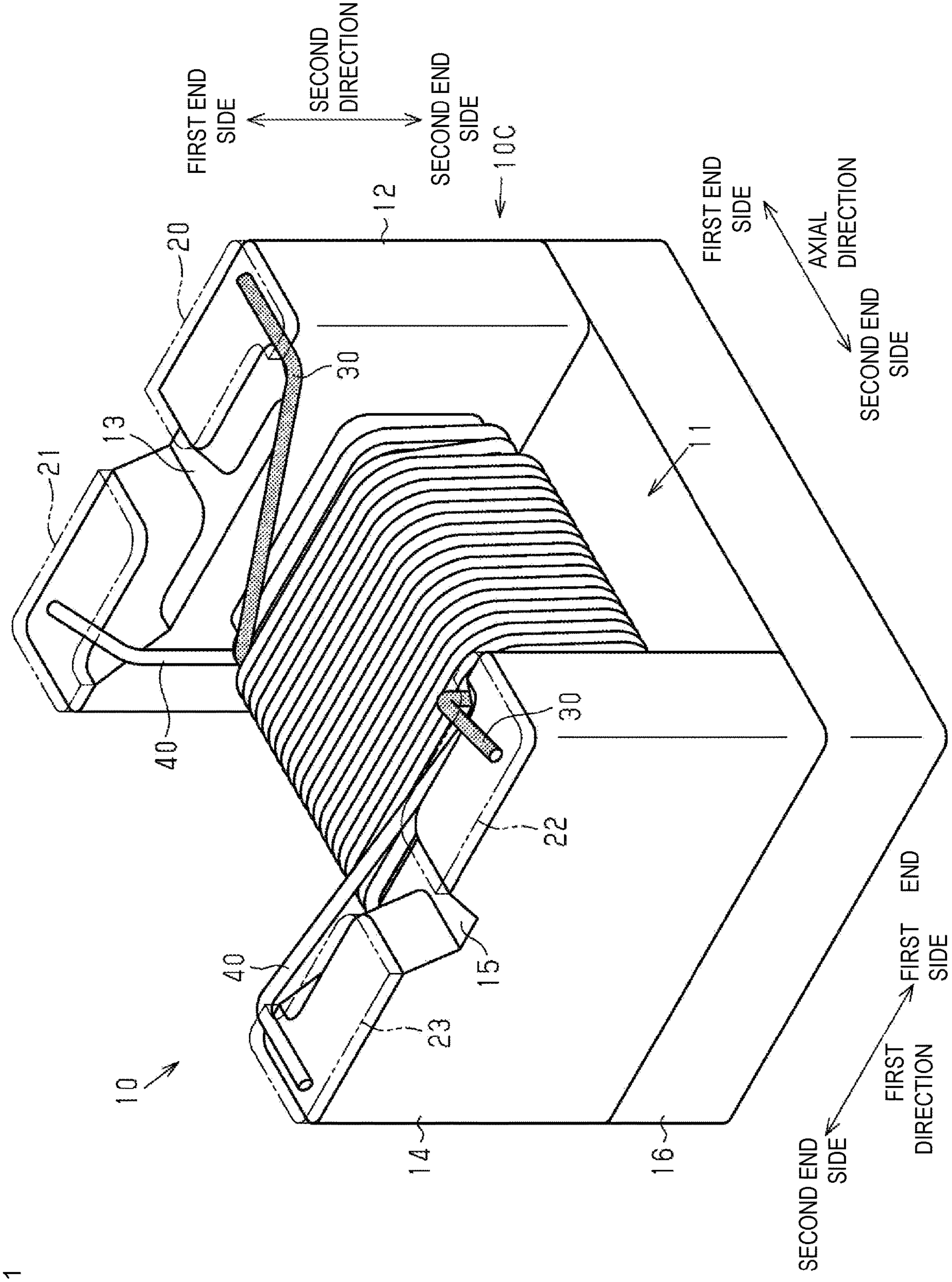
FIG. 1 is a perspective view of a coil component.

As illustrated in FIG. 1, a coil component 10 includes a winding core section 11 having the shape of a substantially rectangular prism. In the following description, a direction that is substantially perpendicular to the axial direction of the winding core section 11 and that extends along the long sides of a cross-sectional rectangle of the winding core section 11 is defined as a first direction, and a direction that is substantially perpendicular to both the axial direction and the first direction is defined as a second direction.

A first flange section 12 is disposed on a first end of the winding core section 11 in the axial direction. The first flange section 12 outwardly extends from the winding core section 11 in the first direction and in the second direction. A recess section 13 is present in an end face of the first flange section 12 on the first end side in the second direction. The recess section 13 is positioned in a substantially central portion of the first flange section 12 in the first direction. The recess section 13 is open to both sides of the first flange section 12 in the axial direction. Hence, a portion of the first flange section 12 on the first end side in the second direction is split into two branches between which the recess section 13 is positioned.

A second flange section 14 is disposed on a second end of the winding core section 11 in the axial direction. The second flange section 14 is substantially symmetrical to the first flange section 12 in the axial direction. That is, a recess section 15 substantially symmetrical to the recess section 13 in the first flange section 12 is present in an end face of the second flange section 14 on the first end side in the second direction.

The winding core section 11, the first flange section 12, and the second flange section 14 constitute a core 10C in the coil component 10. The core 10C is made of a nonconductive material. Specifically, examples of the material of the core 10C may include alumina, a nickel-zinc based ferrite, a resin, and a mixture of them.

A top 16 is attached to the core 10C on the second end side in the second direction. The top 16 has the shape of a substantially rectangular plate. The top 16 is attached to the core 10C such that it is placed across the gap between the end face of the first flange section 12 on the second end side in the second direction and the end face of the second flange section 14 on the second end side in the second direction. The top 16 is made of the same material as that of the core 10C, and the top 16 and the 10*c* form a closed loop.

A first terminal electrode 20 is laminated on the end face of the first flange section 12 on the first end side in the second direction and is positioned on the first end side in the first direction with respect to the recess section 13. A second terminal electrode 21 is laminated on the end face of the first flange section 12 on the first end side in the second direction and is positioned on the second end side in the first direction with respect to the recess section 13.

Similarly, a third terminal electrode 22 is laminated on the end face of the second flange section 14 on the first end side in the second direction and is positioned on the first end side in the first direction with respect to the recess section 15. A fourth terminal electrode 23 is laminated on the end face of the second flange section 14 on the first end side in the second direction and is positioned on the second end side in the first direction with respect to the recess section 15. In FIG. 1, the first terminal electrode 20, second terminal electrode 21, third terminal electrode 22, and fourth terminal electrode 23 are indicated by the dash-dot-dot lines.

The first terminal electrode 20 to fourth terminal electrode 23 described above are composed of a metal layer made of silver and a plating layer made of copper, nickel, or tin applied to the surface of the metal layer. In the present embodiment, in the coil component 10, the side where the first terminal electrode 20 to fourth terminal electrode 23 are disposed is the side facing a substrate when the coil component 10 is mounted on the substrate.

Figure 2:
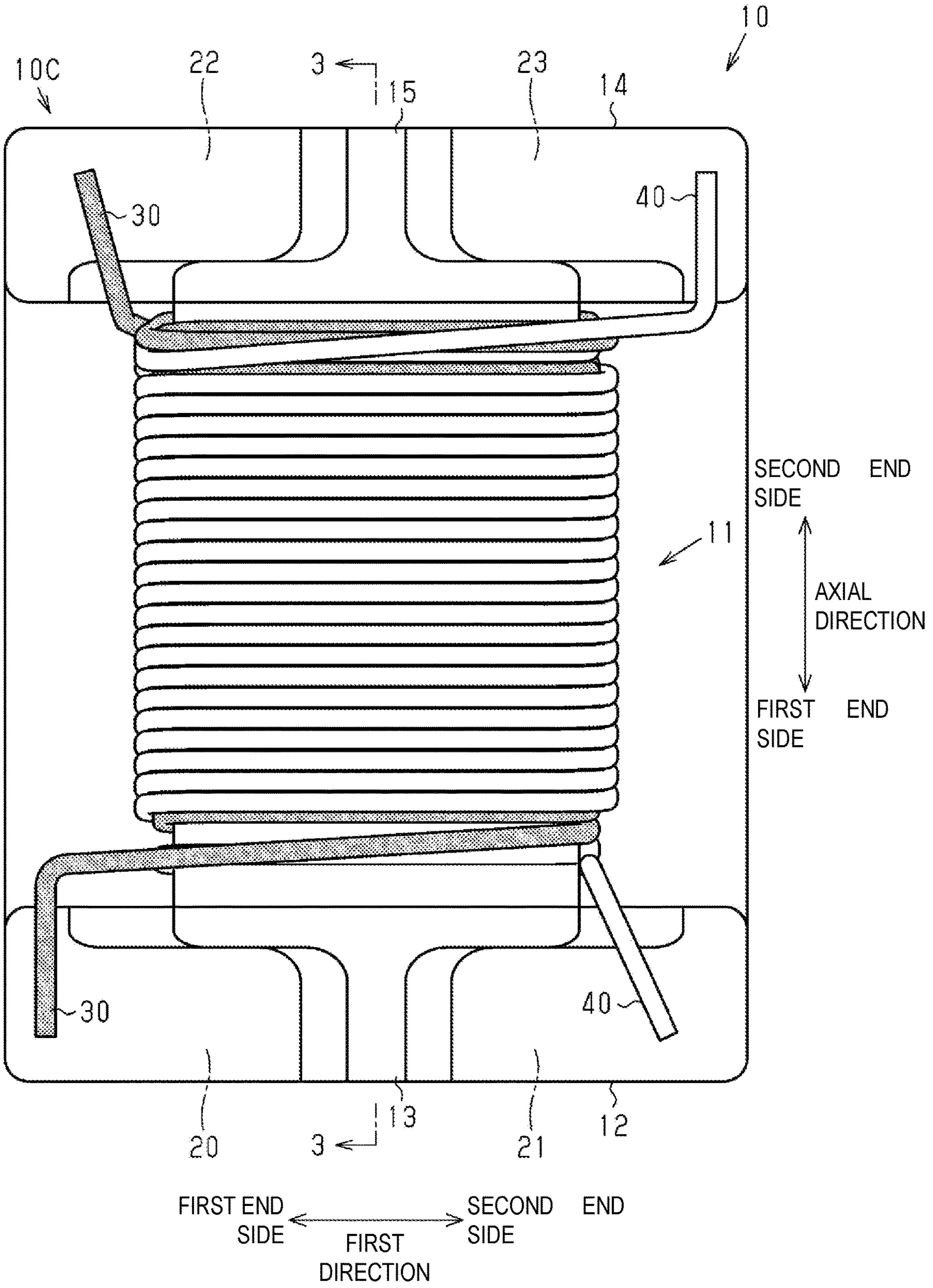
FIG. 2 is a top view of the coil component.

As illustrated in FIG. 2, a first wire 30 is wound around the winding core section 11. The first wire 30 has a substantially circular shape as seen in cross section substantially perpendicular to the direction in which the first wire 30 extends. The first wire 30 is the one in which a copper wire having a diameter of about 30 μm is covered with an insulating film having a thickness of about 10 μm. That is, the diameter of the first wire 30 as seen in cross section is about 50 μm.

A first end of the first wire 30 is connected to the first terminal electrode 20. A portion of the first wire 30 that includes the end connected to the first terminal electrode 20 extends from the first terminal electrode 20 toward a region closer to the second terminal electrode 21 with respect to the center of the winding core section 11 in the first direction. In the present embodiment, the first wire 30 extends from the first terminal electrode 20 toward the edge nearest the second terminal electrode 21 among the four edges of the winding core section 11.

The first wire 30 is wound clockwise around the winding core section 11 as seen from the first end side in the axial direction. A second end portion of the first wire 30 extends from the edge farthest from the fourth terminal electrode 23 among the four edges of the winding core section 11 toward the third terminal electrode 22 in the vicinity of the second flange section 14. The second end of the first wire 30 is connected to the third terminal electrode 22.

A second wire 40 is wound around the winding core section 11. The second wire 40 is a wire having substantially the same cross-sectional shape and dimensions as those of the first wire 30.

A first end of the second wire 40 is connected to the second terminal electrode 21. The second wire 40 extends from the second terminal electrode 21 toward the edge farthest from the first terminal electrode 20 among the four edges of the winding core section 11.

Like the first wire 30, the second wire 40 is wound clockwise around the winding core section 11 as seen from the first end side in the axial direction. A second end portion of the second wire 40 extends from a region closer to the third terminal electrode 22 with respect to the center of the winding core section 11 in the first direction toward the fourth terminal electrode 23 in the vicinity of the second flange section 14 on the winding core section 11. In the present embodiment, the second wire 40 extends from the edge nearest the third terminal electrode 22 among the four edges of the winding core section 11 toward the fourth terminal electrode 23. The second end of the second wire 40 is connected to the fourth terminal electrode 23. That is, a portion of the second wire 40 that includes the end connected to the fourth terminal electrode 23 extends from the region closer to the third terminal electrode 22 with respect to the center of the winding core section 11 in the first direction to the fourth terminal electrode 23.

Figure 3:
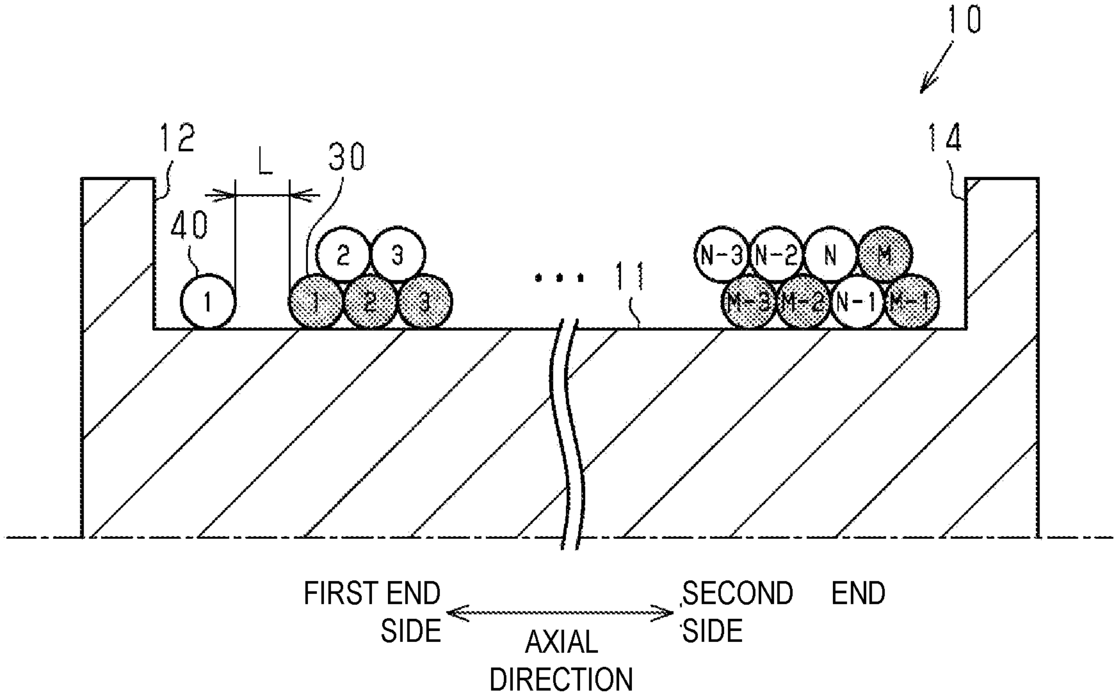
FIG. 3 illustrate a second end side of the inductor component in a second direction in a cross section taken along line 3-3 in FIG. 2.

As illustrated in FIG. 3, in the portion of the first wire 30 wound around the winding core section 11, a single round nearest the end connected to the first terminal electrode 20 in the line of the first wire 30 is defined as the first turn. Specifically, a segment of a wire wound one turn from the location of contact of the wire with the winding core section 11 along the perimeter of the winding core section 11 is defined as a single round. The winding of the first wire 30 wound around the winding core section 11 is counted as the second turn, the third turn, . . . , toward the third terminal electrode 22. The last turn nearest the end connected to the third terminal electrode 22 in the line of the first wire 30 is defined as the Mth turn. That is, in the present embodiment, the first wire 30 is wound by M rounds in total around the winding core section 11. In the present embodiment, the last turn of the first wire 30 means the lastly wound round in a process for winding the first wire 30 around the winding core section 11. In the present embodiment, "in the line of the first wire 30" means being in the path following the first wire 30. In FIG. 3, the first wire 30 is illustrated with dot patterns and the numbers of turns.

The first turn of the first wire 30 is wound on the outer circumferential surface of the winding core section 11 in the vicinity of the first flange section 12. The second turn of the first wire 30 is contiguous to the first turn of the first wire 30 and is closer to the second flange section 14 than the first turn in the axial direction. Similarly, the third turn to the (M−2)th turn of the first wire 30 are contiguous to their respective immediately preceding turns of the first wire 30 and are wound on the outer circumferential surface of the winding core section 11 such that turns of larger numbers are closer to the second flange section 14 in the axial direction.

In the portion of the second wire 40 wound around the winding core section 11, a single round nearest the end connected to the second terminal electrode 21 in the line of the second wire 40 is defined as the first turn. The winding of the second wire 40 wound around the winding core section 11 is counted as the second turn, the third turn, . . . , toward the fourth terminal electrode 23. The single round being the last turn nearest the end connected to the fourth terminal electrode 23 in the line of the second wire 40 is defined as the Nth turn. That is, the second wire 40 is wound by N rounds in total around the winding core section 11. In the present embodiment, the number N of turns of the second wire 40 is the same as the number M of turns of the first wire 30. In the present embodiment, the last turn of the second wire 40 means the lastly wound round in a process for winding the second wire 40 around the winding core section 11. In the present embodiment, "in the line of the second wire 40" means being in the path along the second wire 40. In FIG. 3, the second wire 40 is illustrated without patterns and with the numbers of turns.

The first turn of the second wire 40 is wound on the outer circumferential surface of the winding core section 11 in the vicinity of the first flange section 12. The first turn of the second wire 40 is closer to the first flange section 12 than the first turn of the first wire 30 in the axial direction. In other words, the first turn of the first wire 30 is closer to the second flange section 14 than the first turn of the second wire 40 in the axial direction.

The first turn of the first wire 30 and the first turn of the second wire 40 are spaced away from each other in the axial direction. As the distance L of the gap between the first turn of the first wire 30 and the first turn of the second wire 40, about 50 μm or more is provided. That is, the distance L of the gap between the first turn of the first wire 30 and the first turn of the second wire 40 is not less than about the diameter of the first wire 30.

The second turn of the second wire 40 is wound outside the first wire 30 in the radial direction of the winding core section 11 between the first turn of the first wire 30 and the second turn of the first wire 30. That is, the second turn of the second wire 40 is wound in contact with a valley-shaped portion formed by the outer surface of the first turn of the first wire 30 and the outer surface of the second turn of the first wire 30.

The third turn to the (N−2)th turn of the second wire 40 are contiguous to their respective immediately preceding turns of the second wire 40 and are wound outside the first wire 30 in the radial direction such that turns of larger numbers are closer to the second flange section 14 in the axial direction. The third turn to the (N−2)th turn of the second wire 40 are wound in contact with the first wire 30, like the second turn of the second wire 40.

The (N−1)th turn of the second wire 40 is contiguous to the (M−2)th turn of the first wire 30 and is wound on the outer circumferential surface of the winding core section 11. The (N−1)th turn of the second wire 40 is closer to the second flange section 14 than the (M−2)th turn of the first wire 30 in the axial direction.

The (M−1)th turn of the first wire 30 is contiguous to the (N−1)th turn of the second wire 40 described above and is wound on the outer circumferential surface of the winding core section 11. The (M−1)th turn of the first wire 30 is closer to the second flange section 14 than the (N−1)th turn of the second wire 40 in the axial direction.

The Mth turn, which is the last turn, of the first wire 30 is wound outside the (N−1)th turn of the second wire 40 and the (M−1)th turn of the first wire 30 in the radial direction of the winding core section 11 between those two wires. That is, the Mth turn of the first wire 30 is wound in contact with a valley-shaped portion formed by the outer surface of the (N−1)th turn of the second wire 40 and the outer surface of the (M−1)th turn of the first wire 30.

The Nth turn, which is the last turn, of the second wire 40 is wound outside the (M−2)th turn of the first wire 30 and the (N−1)th turn of the second wire 40 in the radial direction of the winding core section 11 between those two wires. That is, the Nth turn of the second wire 40 is wound in contact with a valley-shaped portion formed by the outer surface of the (M−2)th turn of the first wire 30 and the outer surface of the (N−1)th turn of the second wire 40.

In the above-described configuration, when the Nth turn of the second wire 40 is of interest, the Nth turn of the second wire 40 is closer to the first flange section 12 than the Mth turn of the first wire 30 and the (M−1)th turn of the first wire 30 in the axial direction. The three turns of the wire, which are the (M−1)th turn of the first wire 30, the Mth turn of the first wire 30, and the (N−1)th turn of the second wire 40, being closer to the second flange section 14 than the Nth turn of the second wire 40 in the axial direction are present. In the present embodiment, the wire corresponding to about three radii being closer to the second flange section 14 than the Nth turn of the second wire 40 in the axial direction is present.

Next, the working of the present embodiment is described.

The three turns of the wire closer to the second flange section 14 than the Nth turn of the second wire 40 in the axial direction are wound around the winding core section 11 in the vicinity of the second flange section 14. Accordingly, as illustrated in FIG. 2, the second end portion of the second wire 40 extended from the winding core section 11 and connected to the fourth terminal electrode 23 is spaced away from the third terminal electrode 22 on the second flange section 14 by at least the amount allowing the wires corresponding to about three diameters of the wire to be wound. Specifically, the distance from the second flange section 14 to the location where the Nth turn of the second wire 40 is extended from the winding core section 11 is longer than about one and one-half diameters of the wire, that is, is not less than about 75 μm.

The first turn of the second wire 40 being closer to the first flange section 12 than the first turn of the first wire 30 in the axial direction is wound in the vicinity of the first flange section 12. The distance L of the gap between the first turn of the first wire 30 and the first turn of the second wire 40 is about 50 μm, which is about one diameter of the wire. Accordingly, the first end portion of the first wire 30 extended from the winding core section 11 and connected to the first terminal electrode 20 is spaced away from the second terminal electrode 21 on the first flange section 12 by at least the amount corresponding to about two diameters of the wire. Specifically, the distance from the first flange section 12 to the location where the first turn of the first wire 30 is extended from the winding core section 11 is longer than about two diameters of the wire, that is, is not less than about 100 μm.

Next, the advantages of the present embodiment are described.

Figure 4:
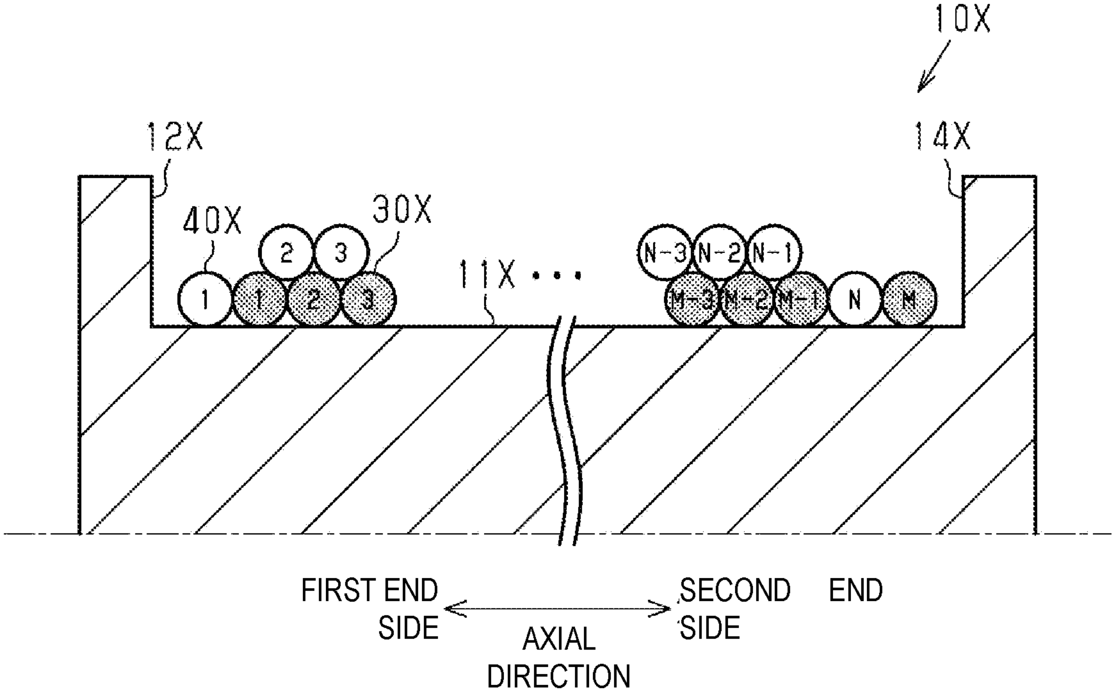
FIG. 4 is a diagram that illustrates wires in a coil component according to a comparative example.

(1) A hypothetical case where winding of a first wire and a second wire of a coil component are different from that in the coil component 10 in the present embodiment is described. For example, as illustrated in FIG. 4, in a coil component 10X, the Nth turn, which is the last turn, of a second wire 40X is wound in contact with the Mth turn, which is the last turn, of a first wire 30X in the vicinity of a second flange section 14X. In the example illustrated in FIG. 4, the Mth turn of the first wire 30X closer to the second flange section 14X in the axial direction is wound on the outer circumferential surface of a winding core section 11X. Only the Mth turn of the first wire 30X is closer to the second flange section 14X than the Nth turn of the second wire 40X in the axial direction. In that case, the distance from the location where the Nth turn of the second wire 40X is extended from the winding core section 11X to the second flange section 14X is about 50 μm at minimum.

In the present embodiment, as described above, the three turns of the wire closer to the second flange section 14 than the Nth turn of the second wire 40 in the axial direction are wound. In other words, the distance allowing the wire to be wound three turns is provided between the Nth turn of the second wire 40 and the second flange section 14. In the coil component 10 according to the present embodiment, in comparison with the above-described coil component 10X illustrated in FIG. 4, the distance from the second wire 40 to the second flange section 14 is longer. Accordingly, the location where the second wire 40 is extended from the edge of the winding core section 11 is more remote from the third terminal electrode 22 in the axial direction. Thus, contact of solder applied to the third terminal electrode 22 with the second wire 40 at the time of mounting the coil component 10 on a substrate or other element can be suppressed.

(2) In the present embodiment, the Nth turn of the second wire 40 is closer to the first flange section 12 than the (N−1)th turn of the second wire 40 in the axial direction. That is, the Nth turn of the second wire 40 is wound back toward the first flange section 12 and is closer thereto than the (N−1)th turn, which is the immediately preceding turn, in the axial direction. This facilitates providing the distance from the Nth turn of the second wire 40 to the second flange section 14.

(3) In the present embodiment, the Nth turn of the second wire 40 is wound in contact with a valley-shaped portion formed by the outer side portion of the (M−2)th turn of the first wire 30 and the outer side portion of the (N−1)th turn of the second wire 40. In other words, in the present embodiment, none of the other turns of the first wire 30 and the second wire 40 are wound outside the Nth turn of the second wire 40 in the radial direction. That is, interference with the other wires in the location where the Nth turn of the second wire 40 is extended from the winding core section 11 is reduced. Thus, interference with the other wires and stress on the second wire 40 when the Nth turn of the second wire 40 is connected to the fourth terminal electrode 23 can be suppressed, and breaks or other events in the second wire 40 caused by the stress can be suppressed.

(4) It is assumed that the first turn of the first wire 30X and the first turn of the second wire 40X are wound in contact with each other around the winding core section 11X in the vicinity of a first flange section 12X in the coil component 10X, as in the example illustrated in FIG. 4. In the example illustrated in FIG. 4, the second wire 40X is closer to the first flange section 12X in the axial direction.

In that example, only the first turn of the second wire 40X is closer to the first flange section 12X than the first turn of the first wire 30X in the axial direction. In that case, the distance from the first turn of the first wire 30X to the first flange section 12X is about 50 μm, which is about one diameter of the wire, at minimum.

In the present embodiment, in a region closer to the first flange section 12 than the first turn of the first wire 30 in the axial direction, only the first turn of the second wire 40 is wound with a gap corresponding to about one diameter of the wire. That is, the distance from the first turn of the first wire 30 to the first flange section 12 is about 100 μm at minimum.

Accordingly, when the coil component 10 in the present embodiment and the above-described example of the coil component 10X are compared, the distance from the first wire 30 to the first flange section 12 in the present embodiment is longer. In other words, the location where the first turn of the first wire 30 is extended from the edge of the winding core section 11 is more remote from the second terminal electrode 21 in the axial direction. Therefore, contact of solder applied to the second terminal electrode 21 with the first wire 30 at the time of mounting the coil component 10 on a substrate or other element can be suppressed.

The present embodiment can be modified as described below. The present embodiment and the following modifications can be combined as long as the combined modifications remain technically consistent with each other.

In the above-described embodiment, the shape of the winding core section 11 is not limited to the example in the above-described embodiment. For example, it may be a substantially circular cylinder or a substantially polygonal prism other than a substantially rectangular prism.

In the above-described embodiment, the material and shape of the first terminal electrode 20 to the fourth terminal electrode 23 are not limited to the examples in the above-described embodiment. For example, the material of the plating layer of each of the first terminal electrode 20 to the fourth terminal electrode 23 may be an alloy of tin and nickel. The first terminal electrode 20 to fourth terminal electrode 23 may include no plating layer, and the metal layer with conductivity may be exposed.

In the above-described embodiment, the cross-sectional shape and dimensions of the first wire 30 and the second wire 40 are not limited to the examples in the above-described embodiment. For example, the copper wire may have a larger diameter, or the insulating film having a larger thickness may be used.

Figure 5:
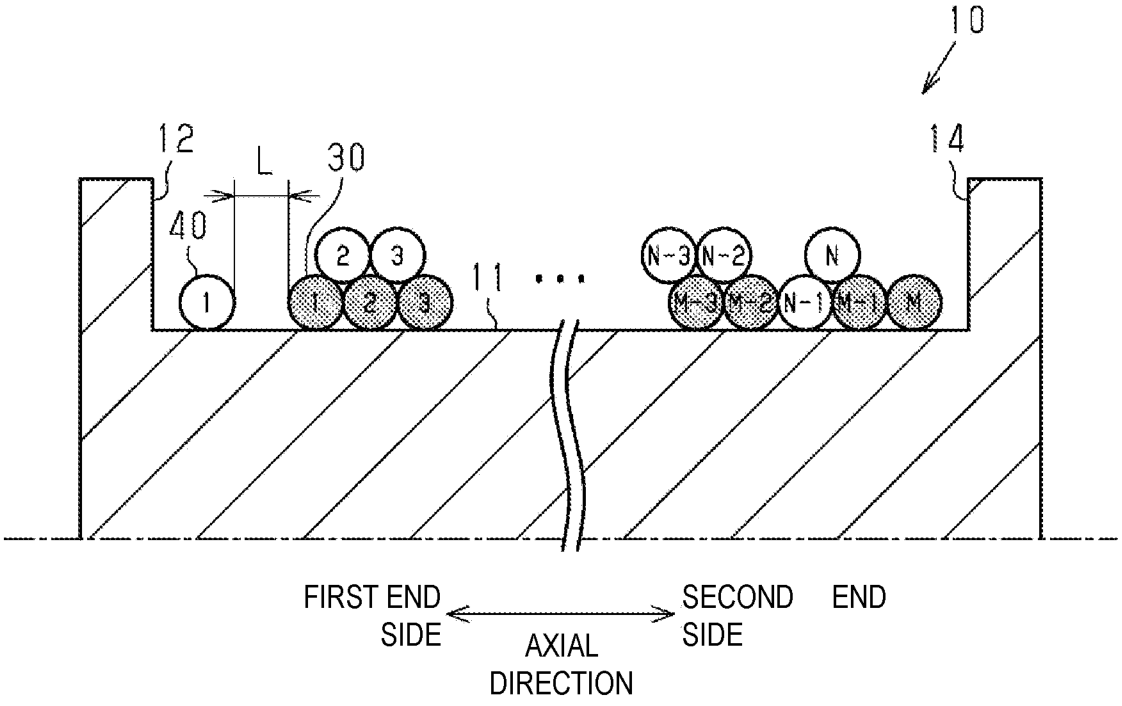
FIG. 5 is a diagram that illustrates wires wound around a winding core section in the coil component according to a variation.

In the above-described embodiment, the wire closer to the second flange section 14 than the Nth turn of the second wire 40 is not limited to the example in the above configuration. For example, the Nth turn of the second wire 40 may be closer to the second flange section 14 than the (N−1)th turn of the second wire 40. In the example illustrated in FIG. 5, the (N−1)th turn of the second wire 40 is contiguous to the (M−2)th turn of the first wire 30 and is wound on the outer circumferential surface of the winding core section 11. The (M−1)th turn of the first wire 30 is contiguous to the (N−1)th turn of the second wire 40 and is wound on the outer circumferential surface of the winding core section 11. The Mth turn of the first wire 30 is contiguous to the (M−1)th turn of the first wire 30 and is wound on the outer circumferential surface of the winding core section 11. The Nth turn of the second wire 40 is wound outside the (N−1)th turn of the second wire 40 and the (M−1)th turn of the first wire 30 in the radial direction of the winding core section 11 between those two wires. In the case of that example, the two turns of the wire closer to the second flange section 14 than the Nth turn of the second wire 40 are present. When the two or more turns of the wire closer to the second flange section 14 than the Nth turn of the second wire 40 are present, the distance corresponding to the diameter of the wire to approximately twice the diameter is provided between the second flange section 14 and the second wire 40. Therefore, contact of solder applied to the third terminal electrode 22 with the second wire 40 at the time of mounting the coil component 10 on a substrate or other element can be suppressed.

Figure 6:
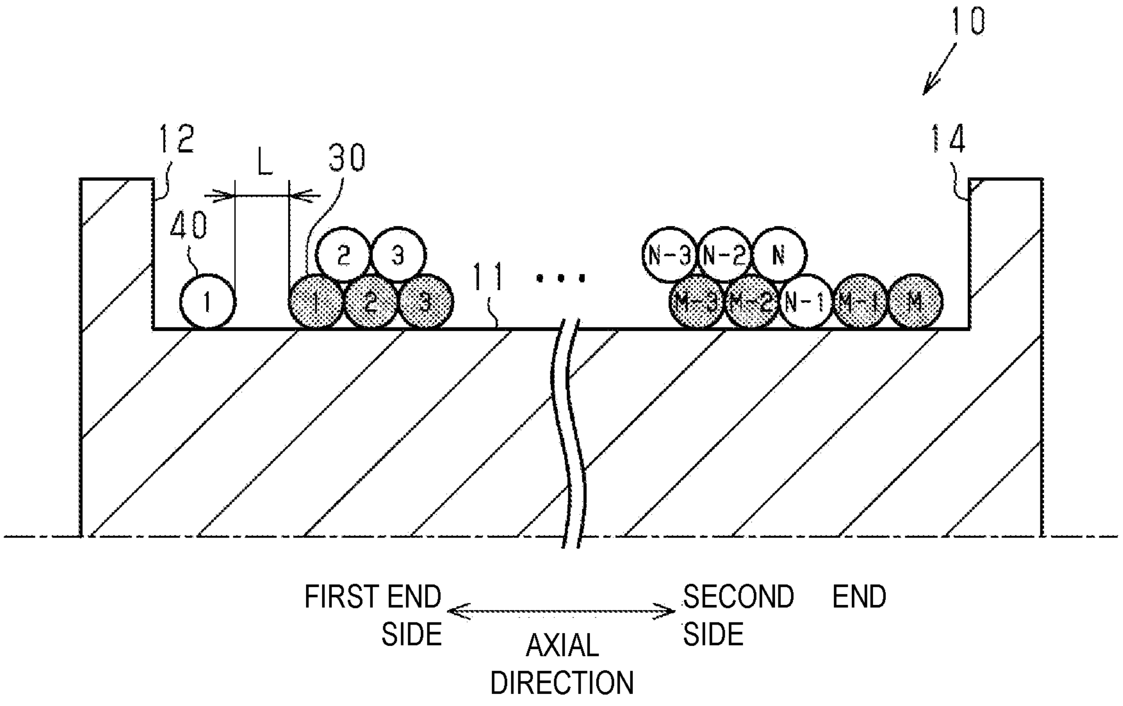
FIG. 6 is a diagram that illustrates wires wound around the winding core section in the coil component according to another variation.

In the example illustrated in FIG. 6, the (N−1)th turn of the second wire 40 is contiguous to the (M−2)th turn of the first wire 30 and is wound on the outer circumferential surface of the winding core section 11. The (M−1)th turn of the first wire 30 is contiguous to the (N−1)th turn of the second wire 40 and is wound on the outer circumferential surface of the winding core section 11. The Mth turn of the first wire 30 is contiguous to the (M−1)th turn of the first wire 30 and is wound on the outer circumferential surface of the winding core section 11. The Nth turn of the second wire 40 is wound outside the (M−2)th turn of the first wire 30 and the (N−1)th turn of the second wire 40 in the radial direction of the winding core section 11 between those two wires. In the case of that example, the three turns of the wire closer to the second flange section 14 than the Nth turn of the second wire 40 are present. As in that example and the above-described embodiment, when the Nth turn of the second wire 40 is closer to the first flange section 12 than the (N−1)th turn, this facilitates providing the distance between the Nth turn of the second wire 40 and the second flange section 14.

In the above-described embodiment, the (M−1)th turn and Mth turn of the first wire 30 may be closer to the first flange section 12 than the Nth turn of the second wire 40 in the axial direction. In that example, for example, the (N−2)th turn and (N−1)th turn of the second wire 40 may be arranged in positions closer to the second flange section 14 than the Nth turn of the second wire 40.

In the above-described embodiment, the Nth turn of the second wire 40 and the second turn to (N−2)th turn of the second wire 40 are wound outside the first wire 30 in the radial direction. Some of those turns may be wound on the outer circumferential surface of the winding core section 11. For example, the second turn of the second wire 40 may fall into the gap between the first turn and second turn of the first wire 30 and be wound on the outer circumferential surface of the winding core section 11. Similarly, some of the turns of the first wire 30 may ride on other turns of the first wire 30 or the second wire 40 and be wound outside the other wires in the radial direction.

In the above-described embodiment, the first turn of the first wire 30 and the first turn of the second wire 40 may be wound in contact with each other around the winding core section 11. In that case, because the wires in contact with each other are wound around the winding core section 11, improvement in the value of inductance of the coil component 10 can be expected.

In the above-described embodiment, the distance L of the gap between the first turn of the first wire 30 and the first turn of the second wire 40 may be smaller than the diameter of the first wire 30.

The total number M of turns of the first wire 30 and the total number N of turns of the second wire 40 may not be the same. For example, when the first wire 30 and the second wire 40 are wound around the core 10C at the same time, both of the total numbers of turns can be easily equalized. In contrast, when after the first wire 30 is wound around the core 10C, the second wire 40 is wound, both of the total numbers of turns can be different easily.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:

a winding core section having a cuboid shape;

a first flange section disposed on a first end of the winding core section in an axial direction;

a second flange section disposed on a second end of the winding core section in the axial direction;

a first terminal electrode disposed on an end portion of the first flange section on a first end side in a first direction perpendicular to the axial direction;

a second terminal electrode disposed on an end portion of the first flange section on a second end side in the first direction;

a third terminal electrode disposed on an end portion of the second flange section on the first end side in the first direction;

a fourth terminal electrode disposed on an end portion of the second flange section on the second end side in the first direction;

a first wire wound around the winding core section and having a first end connected to the first terminal electrode and a second end connected to the third terminal electrode; and a second wire wound around the winding core section and having a first end connected to the second terminal electrode and a second end connected to the fourth terminal electrode, wherein when a direction perpendicular to both the axial direction and the first direction is defined as a second direction, the first flange section outwardly extends from the winding core section in the second direction, the second flange section outwardly extends from the winding core section in the second direction, and a portion of the second wire that includes the end connected to the fourth terminal electrode extends from a region closer to the third terminal electrode with respect to a center of the winding core section to the fourth terminal electrode in the first direction, and when in a portion of the first wire wound around the winding core section, a single round nearest the end connected to the first terminal electrode in a line of the first wire is defined as a first turn and a final turn nearest the end connected to the third terminal electrode in the line of the first wire is defined as an Mth turn, and in a portion of the second wire wound around the winding core section, a single round nearest the end connected to the second terminal electrode in a line of the second wire is defined as a first turn and a final turn nearest the end connected to the fourth terminal electrode in the line of the second wire is defined as an Nth turn, at least two turns of the first wire closer to the second flange section than the Nth turn of the second wire in the axial direction are present, and an (N−1) th turn of the second wire is closer to the center of the winding core section than the Nth turn of the second wire.

2. The coil component according to claim 1, wherein the Nth turn of the second wire is closer to the first flange section than the Mth turn of the first wire and the (M−1) th turn of the first wire in the axial direction.

3. The coil component according to claim 1, wherein the Nth turn of the second wire is closer to the first flange section than the (N−1) th turn of the second wire in the axial direction.

4. The coil component according to claim 1, wherein a portion of the first wire that includes the end connected to the first terminal electrode extends from a region closer to the first terminal electrode toward a region closer to the second terminal electrode with respect to the center of the winding core section in the first direction, and the first turn of the first wire is closer to the second flange section than the first turn of the second wire in the axial direction.

5. The coil component according to claim 4, wherein the first turn of the first wire is spaced away from the first turn of the second wire in the axial direction.

6. The coil component according to claim 5, wherein the first wire has a circular shape as seen in cross section perpendicular to a direction in which the first wire extends, and a distance of a gap between the first turn of the first wire and the first turn of the second wire in the axial direction is not less than a diameter of the first wire.

7. The coil component according to claim 2, wherein the Nth turn of the second wire is closer to the first flange section than the (N−1) th turn of the second wire in the axial direction.

8. The coil component according to claim 2, wherein a portion of the first wire that includes the end connected to the first terminal electrode extends from a region closer to the first terminal electrode toward a region closer to the second terminal electrode with respect to the center of the winding core section in the first direction, and first turn of the first wire is closer to the second flange section than the first turn of the second wire in the axial direction.

9. The coil component according to claim 3, wherein a portion of the first wire that includes the end connected to the first terminal electrode extends from a region closer to the first terminal electrode toward a region closer to the second terminal electrode with respect to the center of the winding core section in the first direction, and the first turn of the first wire is closer to the second flange section than the first turn of the second wire in the axial direction.

10. The coil component according to claim 7, wherein a portion of the first wire that includes the end connected to the first terminal electrode extends from a region closer to the first terminal electrode toward a region closer to the second terminal electrode with respect to the center of the winding core section in the first direction, and the first turn of the first wire is closer to the second flange section than the first turn of the second wire in the axial direction.

11. The coil component according to claim 8, wherein the first turn of the first wire is spaced away from the first turn of the second wire in the axial direction.

12. The coil component according to claim 9, wherein the first turn of the first wire is spaced away from the first turn of the second wire in the axial direction.

13. The coil component according to claim 10, wherein the first turn of the first wire is spaced away from the first turn of the second wire in the axial direction.

14. The coil component according to claim 11, wherein the first wire has a circular shape as seen in cross section perpendicular to a direction in which the first wire extends, and a distance of a gap between the first turn of the first wire and the first turn of the second wire in the axial direction is not less than a diameter of the first wire.

15. A coil component comprising:

a winding core section having a cuboid shape;

a first flange section disposed on a first end of the winding core section in an axial direction;

a second flange section disposed on a second end of the winding core section in the axial direction;

a first terminal electrode disposed on an end portion of the first flange section on a first end side in a first direction perpendicular to the axial direction;

a second terminal electrode disposed on an end portion of the first flange section on a second end side in the first direction;

a third terminal electrode disposed on an end portion of the second flange section on the first end side in the first direction;

a fourth terminal electrode disposed on an end portion of the second flange section on the second end side in the first direction;

a first wire wound around the winding core section and having a first end connected to the first terminal electrode and a second end connected to the third terminal electrode; and a second wire wound around the winding core section and having a first end connected to the second terminal electrode and a second end connected to the fourth terminal electrode, wherein when a direction perpendicular to both the axial direction and the first direction is defined as a second direction, the first flange section outwardly extends from the winding core section in the second direction, the second flange section outwardly extends from the winding core section in the second direction, and a portion of the second wire that includes the end connected to the fourth terminal electrode extends from a region closer to the third terminal electrode with respect to a center of the winding core section to the fourth terminal electrode in the first direction, and when in a portion of the first wire wound around the winding core section, a single round nearest the end connected to the first terminal electrode in a line of the first wire is defined as a first turn and a final turn nearest the end connected to the third terminal electrode in the line of the first wire is defined as an Mth turn, and in a portion of the second wire wound around the winding core section, a single round nearest the end connected to the second terminal electrode in a line of the second wire is defined as a first turn and a final turn nearest the end connected to the fourth terminal electrode in the line of the second wire is defined as an Nth turn, at least two turns of the first wire closer to the second flange section than the Nth turn of the second wire in the axial direction are present, and the first turn and an (N−1) th turn of the second wire are closer to the center of the winding core section than the Nth turn of the second wire.

16. The coil component according to claim 15, wherein the Nth turn of the second wire is closer to the first flange section than the Mth turn of the first wire and the (M−1) th turn of the first wire in the axial direction.

17. The coil component according to claim 15, wherein the Nth turn of the second wire is closer to the first flange section than the (N−1) th turn of the second wire in the axial direction.

18. A coil component comprising:

a winding core section having a cuboid shape;

a first flange section disposed on a first end of the winding core section in an axial direction;

a second flange section disposed on a second end of the winding core section in the axial direction;

a first terminal electrode disposed on an end portion of the first flange section on a first end side in a first direction perpendicular to the axial direction;

a second terminal electrode disposed on an end portion of the first flange section on a second end side in the first direction;

a third terminal electrode disposed on an end portion of the second flange section on the first end side in the first direction;

a fourth terminal electrode disposed on an end portion of the second flange section on the second end side in the first direction;

a first wire wound around the winding core section and having a first end connected to the first terminal electrode and a second end connected to the third terminal electrode; and a second wire wound around the winding core section and having a first end connected to the second terminal electrode and a second end connected to the fourth terminal electrode, wherein when a direction perpendicular to both the axial direction and the first direction is defined as a second direction, the first flange section outwardly extends from the winding core section in the second direction, the second flange section outwardly extends from the winding core section in the second direction, and a portion of the second wire that includes the end connected to the fourth terminal electrode extends from a region closer to the third terminal electrode with respect to a center of the winding core section to the fourth terminal electrode in the first direction, and when a portion of the first wire wound around the winding core section, a single round nearest the end connected to the first terminal electrode in a line of the first wire is defined as a first turn and a last turn nearest the end connected to the third terminal electrode in the line of the first wire is defined as an Mth turn, and in a portion of the second wire wound around the winding core section, a single round nearest the end connected to the second terminal electrode in a line of the second wire is defined as a first turn and a last turn nearest the end connected to the fourth terminal electrode in the line of the second wire is defined as an Nth turn, at least two turns of the first wire closer to the second flange section than the Nth turn of the second wire in the axial direction are present, and the first turn of the second wire is spaced away from the first turn of the first wire in the axial direction and closer to the center of the winding core section than the second turn of the second wire.

19. The coil component according to claim 1, wherein the (N−1) th turn of the second wire is closer to the center of the winding core section than an (N−2) th turn of the second wire.

20. The coil component according to claim 15, wherein the first turn and the (N−1) th turn of the second wire are closer to the center of the winding core section than remaining turns of the second wire.

* * * * *